United States Patent

Stiles

[15] 3,637,528
[45] Jan. 25, 1972

[54] LOW TEMPERATURE-SHIFT CATALYST

[72] Inventor: Alvin B. Stiles, Wilmington, Del.

[73] Assignee: E. I. du Pont de Nemours and Company, Wilmington, Del.

[22] Filed: Aug. 26, 1969

[21] Appl. No.: 853,201

Related U.S. Application Data

[63] Continuation-in-part of Ser. No. 688,407, Dec. 6, 1967.

[52] U.S. Cl. ............................................ 252/454, 252/457
[51] Int. Cl. ............................... B01j 11/58, B01j 11/32
[58] Field of Search ......................... 252/454, 449; 23/213

[56] References Cited

UNITED STATES PATENTS

| | | | |
|---|---|---|---|
| 2,524,566 | 10/1950 | Houtman et al. | 23/213 X |
| 2,941,958 | 6/1960 | Connor, Jr. et al. | 252/449 |
| 3,388,972 | 6/1968 | Reitmeier et al. | 23/213 |
| 3,390,102 | 6/1968 | Reitmeier | 252/475 |

Primary Examiner—Daniel E. Wyman
Assistant Examiner—C. F. Dees
Attorney—Lynn N. Fisher

[57] ABSTRACT

A reduced zinc oxide-copper oxide low-temperature shift catalyst is prepared that contains colloidal silica and diatomaceous earth. The resulting catalyst has improved pore, density and strength characteristics.

2 Claims, No Drawings

LOW TEMPERATURE-SHIFT CATALYST

CROSS-REFERENCE TO RELATED APPLICATIONS

This application is a continuation-in-part of my copending application Ser. No. 688,407, filed Dec. 6, 1967.

BACKGROUND OF THE INVENTION

In the preparation of hydrogen and hydrogen-containing gas by a hydrocarbon reforming process, one of the steps is generally a water gas shift reaction. In this reaction carbon monoxide and water or steam are reacted over a shift catalyst to produce carbon dioxide and hydrogen. The shift catalyst has usually been a metal of the iron group. When conventional iron-chromium catalysts are used industrially, the reaction is carried out at temperatures between 650° F. and 1000° F., generally at about 750° F. Low temperature-shift catalysts have been developed and they can operate industrially at temperatures between 300° F. and 700° F. In many units, the shift reaction is conducted using both the conventional catalyst and the low temperature shift catalyst in series.

A low-temperature-shift catalyst which has been used in this process is a reduced zinc oxide-copper oxide catalyst. With these low temperature-shift catalysts there has been a problem of preparing the catalysts in sufficient hardness to withstand severe operating conditions such as pulsating or extremely rapid gas flow or drenching with liquid water. If the catalyst materials are pressed to make them sufficiently hard, then the porosity and resulting catalystic activity is adversely affected and the density is increased so that the weight of the catalyst charge to fill a given converter is increased uneconomically.

SUMMARY OF THE INVENTION

I have discovered that the reduced copper oxide-zinc oxide low temperature-shift catalyst can be improved if during its preparation colloidal silica and diatomaceous earth are added to the catalyst to increase thermal stability and to control density and pore size.

The resulting catalyst performs at least as well on a volume basis as the conventional catalyst, but because of the lower density and increased pore volume, the catalyst weight per charge is reduced considerably. Consequently, on a weight basis catalyst activity is increased inversely proportional to the change in density. The cost of the catalyst per pound is reduced in that the colloidal silica and diatomaceous earth are less expensive than the catalyst ingredients. Further the addition of the two types of siliceous materials results in the catalyst being easier to process during manufacture. Finally, the addition provides a catalyst having a longer useful life because its porosity and hence its ability to adsorb and scavenge poisons is increased so that the upstream catalyst protects the downstream portion.

DETAILED DESCRIPTION OF THE INVENTION

In making hydrogen from carbon monoxide containing gases and steam or water, the gas is passed over a shift catalyst to produce the following reaction:

$$CO + H_2O \rightleftharpoons CO_2 + H_2$$

This reaction is usually carried out at temperatures from 650° F. up to 1000° F., preferably about 750° F., when conventional iron-chromium catalysts are used. However, the shift to the $CO_2 + H_2$ products is favored by lower temperatures.

When a reduced zinc oxide-copper oxide shift catalyst is used, the reaction of the carbon monoxide to hydrogen and carbon dioxide will occur at temperatures below 550° F., i.e., 250° F. to 550° F. as well as temperatures up to 700° F. This favors the equilibrium for the production of the desired $H_2$.

In view of advantages offered by these low-temperature shift catalysts, they are widely used by industry. They have been used as the sole shift catalyst or they have been used in combination with the conventional iron-chromium catalysts.

In making the improved low temperature-shift catalysts of the invention, conventional procedures are followed except that colloidal silica and diatomaceous earth are added to the mixture of copper and zinc, preferably immediately prior to the precipitation step.

Thus, a conventional low temperature zinc oxide-copper oxide shift catalyst is made containing zinc and copper, after reduction, in a weight ratio (or atomic ratio since the atomic weights are so similar), based on metal of 0.5 to 4 zinc to 1 copper, preferably 2 zinc to 1 copper.

The conventional catalyst is generally prepared by coprecipitating copper and zinc, usually as their carbonates, from an aqueous solution of their soluble salts. The useful soluble salts include the chlorides, sulfates, acetates, nitrates and the formates. These salts are coprecipitated in amounts which will produce the desired copper-zinc ratios.

The soluble salts are coprecipitated by the addition of an aqueous solution of sodium carbonate, however, other precipitants such as the bicarbonates, oxalates, or hydroxides of sodium, potassium, lithium or ammonia can be used. The sodium carbonate coprecipitates the zinc and copper as their carbonates by a double decomposition. At least a stoichiometric amount of sodium carbonate is used, and an excess is usually preferred.

In the process of making the improved catalysts of the invention, prior to the addition of the sodium carbonate, preferably the colloidal silica and diatomaceous earth are added to the solution of zinc and copper salts and thoroughly mixed. However, they can be added after precipitation or even after calcining or in intermediate stages.

The colloidal silica which can be used will vary in size from 7 to 150 millimicrons in average particle diameter. Such colloidal silicas are commercially available as 2 to 50 percent by weight silica aquasols. In view of the fact it is desired to have the catalyst product substantially free from sodium, sodium free silica sols are preferred for use, although sodium stabilized silica sols can be used, particularly if the precipitate is well washed to remove foreign salts.

The amount of aqueous colloidal silica sol added can vary from 2 to 35 percent by weight based on the active catalyst component, preferably about 8 to 10 percent by weight. This results in 0.60 to 10.5 percent by weight based on the active component of colloidal silica in the final product.

Diatomaceous earth is a naturally occurring material and is commercially available. It is also sold under the names "diatomite" and "Kieselguhr". It is found in nature as a soft earthy rock and a typical analysis reveals the following composition:

| | |
|---|---|
| $SiO_2$ | 86.9% |
| $Al_2O_3$ | 2.3% |
| $Fe_2O_3$ | 1.3% |
| CaO | 0.4% |
| $K_2O$ | 3.6% |
| Water | 4.9% |

In making the catalyst of the invention, commercial grades of diatomaceous earth can be used. The diatomaceous earth should be of a state of subdivision that essentially 100 percent will pass through a 325-mesh U. S. standard screen. It will generally be added as a slurry in water; however, if there is sufficient water already in the mix, it can be added as a dry powder.

The amount of diatomaceous earth added can vary from 1 to 20 percent by weight based on the active catalyst component, preferably 4 to 6 percent by weight. Certain high-silica, raw or acid-treated clays can also be used but they are less desirable than the diatomaceous earth.

After the zinc and copper salts, colloidal silica and diatomaceous earth are coprecipitated by the addition of sodium carbonate, the conventional procedures can then be utilized. Thus, the precipitated materials can be filtered, dried and ignited to convert the zinc and copper carbonates to the oxides, thoroughly washed to reduce the content of any residual salts, e.g., sulfur from sulfates, redried, and pilled or formed into cylindrical tablets or any other desired shape. The catalyst is then suitable for charging into a converter where it can be reduced in situ by the reaction mixture of steam and reformer product gas or by hydrogen diluted with any convenient diluent gas, i.e., $N_2$, $H_2O$, $CH_4$, $CO_2$ or their mixtures.

If desired various promoters, stabilizers, or interspersants can be added to the catalyst. For example, alkali or alkaline earth oxides, hydroxides, chromates, vanadates or carbonates can be added as promoters. If desired interspersants as defined in U.S. Pat. No. 3,317,439 can also be added to the catalyst by the methods set forth in that patent.

The shift reaction employing low temperature-shift catalysts is well known and the catalyst of the invention can be incorporated into this reaction without any modifications. Thus, carbon monoxide, or a gas containing 1.0 percent or more carbon monoxide by volume, and steam in an amount of 3 to 10 volumes per volume of carbon monoxide are introduced into a shift converter and passed over the shift catalyst of the invention. The reaction occurs at temperatures between 250° F. and 700° F. and the pressure is preferably in the range of 200 to 400 pounds per square inch (p.s.i.g.), although it may vary from atmospheric to 800 p.s.i.g. The space velocity, which is the volume of gas flowing under standard conditions of temperature and pressure per unit volume of catalyst per hour, of the carbon monoxide-containing gas, on a dry basis, is desirably between 300 and 6,500 (cubic feet per hour per cubic foot of catalyst).

The following examples are offered to illustrate the invention, all parts are parts by weight unless otherwise indicated.

EXAMPLE 1

(1) Sixty-three parts of copper as copper sulfate and 130 parts of zinc as zinc sulfate are dissolved in 2,000 parts of distilled water at 25° C. It is noted that throughout the application when water is mentioned the water should be of reasonable purity and especially if the normal tap water supply is high in impurities it will be desirable to use distilled or demineralized water in accordance with conventional practices.

(2) Forty parts of a 30 percent silica aquasol, having an average particle size of 15 millimicrons and 12 parts of diatomaceous earth in 150 parts of water are added to the solution of step (1) maintaining the temperatures of the combined liquids at 25° C. The diatomaceous earth passes through a 325-mesh screen.

(3) Three hundred and fifty parts of sodium carbonate are dissolved in 2,000 parts of water, also at 25° C. This solution is added to the one prepared in steps (1) and (a) above to effect precipitation. The precipitate is washed to remove the sulfate ion and is filtered.

(4) The filter cake is dried and is calcined at 425° C. for 2 hours.

(5) The calcined filter cake is kneaded with sufficient water to make a paste. The kneaded paste after drying is crushed and screened to form granules usable as a catalyst. It can instead be pulverized and after addition of a lubricant, pelleted in conventional manner. The density of the catalyst is decreased to about 82 percent of the density of a conventional zinc oxide-copper oxide catalyst prepared in the same manner but not containing the siliceous materials.

(6) The catalyst as thus prepared is useful for conversion of carbon monoxide in the presence of steam to carbon dioxide and hydrogen.

EXAMPLE 2

The method of making a zinc oxide-copper oxide catalyst as described in U.S. Pat. No. 3,303,001 can be modified as follows:

To 4,300 parts of a 16 percent sodium carbonate solution heated to 140° F., are added 2,620 parts of an 8 percent (based on metal) solution consisting of zinc and copper nitrates in a mole ratio (also based on metal) of one zinc to one copper, heated to 90° F. Eighty-five parts of a 30 percent silica aquasol having particles of an average size of 15 millimicrons and 25 parts of diatomaceous earth in 250 parts of water. The 8 percent metal solution is made by mixing 482 parts by weight of $Zn(NO_3)_2 6H_2O$ and 478 parts by weight of $Cu(NO_3)_2 6H_2O$ with 1,670 parts by weight of water.

The zinc carbonate-copper carbonate, microspheroidal silica gel, diatomaceous earth precipitate is washed and allowed to settle. The solids are filtered on a Sperry filter press and calcined for 4 hours at 700° F. to form the oxides of the zinc and copper. The resulting oxides are deaerated by forming a mud and then they are control dried to 5 to 10 percent moisture. The cake is granulated through a No. 8 mesh screen, mixed with 1 to 3 weight percent graphite as a lubricant and pelletized into 3/16inch tablets on a Strokes tabletting machine. The tablets are then heated for 4 to 10 hours at 300° F. to temper tabletting stresses; a higher temperature for a shorter time is also applicable.

Instead of the 85 parts of 30 percent silica aquasol specified in the second paragraph of this example, there can be used 10 to 165 parts; instead of the 25 parts of diatomaceous earth specified in this same paragraph, there can be used 5 to 50 parts. With a change in colloidal silica there is preferably a corresponding change in the diatomaceous earth but it is possible to decrease the colloidal silica addition without a corresponding decrease in the diatomaceous earth. The highest total siliceous content introduces the maximum lowering of density. Increasing the colloidal silica ratio increases catalyst strength and abrasion resistance.

The resulting tablets are then reduced in situ in a water gas shift reactor and are useful for a low temperature-shift reaction.

I claim:

1. In the process for making a low temperature reduced zinc oxide-copper oxide shift catalyst by coprecipitating zinc and copper from a solution of their soluble salts, the improvement comprising adding to the solution of said soluble salts prior to precipitation 2 to 35 percent by weight of a colloidal silica aquasol and 1 to 20 percent by weight of diatomaceous earth.

2. In an improved low temperature zinc oxide-copper oxide shift catalyst, having on a weight ratio 0.5 to 4 zinc to 1 copper, the improvement comprising the presence of 0.60 to 10.5 percent by weight of colloidal silica and 1 to 20 percent by weight diatomaceous earth in the catalyst.

* * * * *